(12) United States Patent
Pasquier et al.

(10) Patent No.: US 12,485,436 B2
(45) Date of Patent: Dec. 2, 2025

(54) WATER DISTRIBUTION DEVICE FOR A SHOWER INSTALLATION HAVING A JET SELECTOR

(71) Applicant: SKINJAY, Paris (FR)

(72) Inventors: Nicolas Pasquier, Lyons (FR); Luc Maugenet, Villars-les-Dombes (FR)

(73) Assignee: Fortune Brands Water Innovations LLC, North Olmsted, OH (US)

( * ) Notice: Subject to any disclaimer, the term of this patent is extended or adjusted under 35 U.S.C. 154(b) by 94 days.

(21) Appl. No.: 18/555,628

(22) PCT Filed: Apr. 7, 2022

(86) PCT No.: PCT/FR2022/050650
§ 371 (c)(1),
(2) Date: Oct. 16, 2023

(87) PCT Pub. No.: WO2022/219267
PCT Pub. Date: Oct. 20, 2022

(65) Prior Publication Data
US 2024/0342731 A1    Oct. 17, 2024

(30) Foreign Application Priority Data
Apr. 14, 2021   (FR) .................................. 2103872

(51) Int. Cl.
*B05B 1/18*        (2006.01)
*B05B 7/24*        (2006.01)
*B05B 12/00*       (2018.01)

(52) U.S. Cl.
CPC ............ *B05B 1/185* (2013.01); *B05B 7/2462* (2013.01); *B05B 12/002* (2013.01)

(58) Field of Classification Search
CPC ..... B05B 1/185; B05B 1/3026; B05B 1/1636; B05B 7/2462; B05B 12/002; E03C 1/0405
See application file for complete search history.

(56) References Cited

U.S. PATENT DOCUMENTS 2,043,714 A  *  6/1936  Schellin ................ B05B 1/1636
                                                239/447
2,592,062 A  *  4/1952  Perry .................... F16K 11/087
                                                251/315.12

(Continued)

FOREIGN PATENT DOCUMENTS

DE         19501313 A1    7/1996
WO      2014063339 A1    5/2014

OTHER PUBLICATIONS

International Search Report for International App. No. PCT/FR2022/050650 dated Jul. 13, 2022 (5 pages).

(Continued)

*Primary Examiner* — Patrick C Williams
(74) *Attorney, Agent, or Firm* — Calfee, Halter & Griswold LLP (57) ABSTRACT

The invention relates to a water distribution device (1) for a shower installation, comprising: —a distribution head (12) comprising at least two groups of water ejection nozzles (14, 16, 18), each group of nozzles (14, 16, 18) being connected to at least one respective distribution channel; —a supply channel; —a jet selection device (20), interposed between the supply channel and each of the distribution channels, the selection device (20) comprising an internal body (20a) of spheroidal shape, the internal body (20a) being arranged in a housing of complementary shape formed in a body (10) of the distribution device, the internal body (20a) being movable in rotation about two perpendicular axes, between a plurality of distribution positions, each distribution position (Continued)

making it possible to put the supply channel and at least one distribution channel in fluid communication, the selection device (20) comprising a control element (20b) secured to the internal body (20a), the control element (20b) being operable by a user in order to modify the position of the internal body (20a).

23 Claims, 7 Drawing Sheets

(56) References Cited

U.S. PATENT DOCUMENTS

| | | | | |
|---|---|---|---|---|
| 3,056,418 A | * | 10/1962 | Adams | F16K 11/087 251/315.1 |
| 5,634,220 A | * | 6/1997 | Chiu | E03C 1/0405 4/678 |
| 2021/0148101 A1 | * | 5/2021 | Lev | F16K 31/605 |

OTHER PUBLICATIONS

Written Opinion of the International Search Authority for International App. No. PCT/FR2022/050650 dated Jul. 13, 2022 (11 pages).

* cited by examiner

WATER DISTRIBUTION DEVICE FOR A SHOWER INSTALLATION HAVING A JET SELECTOR

The invention relates to the field of bathroom equipment and accessories, and more particularly to the field of plumbing fittings. The invention relates more precisely to a water distribution device for a shower installation, such as a hand-held showerhead or a showerhead.

Showerheads, also referred to as hand-held showerheads, are very frequently equipped with a device allowing a user to select one type of water jet from several available. The different water jets available allow the user to choose from different jet shapes and pressures.

In order to allow selection of the desired jet, known showerheads generally comprise a selection button or a selection lever. A single selection button allows the user to change jet type each time the button is pressed, generally in a determined and non-modifiable sequence. A selection lever makes it possible to act on the rotation of an indexed selection crown, each predetermined position corresponding to a type of jet. Known selection devices for the most part impose on the user a sequence of changes between the different types of jet and do not allow a direct transition from one type of jet to another if they do not follow each other directly within this sequence. Furthermore, the selection between the different jet types is generally exclusive, in the sense that it is not possible to select two jet types simultaneously.

The present invention starts from the observation that with the multiplication of the different types of jet offered today by the showerheads available on the market, there is a need to offer the user a more flexible mode of selection between the different types of jets, making it possible to multiply the possible choices and to offer finer control of the result obtained.

The present invention aims to remedy the drawbacks of the state of the art, in particular those described above, by proposing a distribution device making it possible to obtain different types of jet and comprising an improved jet selection device.

To this end, the invention relates to a water distribution device for a shower installation, the distribution device comprising:
  a distribution head comprising at least two groups of water ejection nozzles, each group of nozzles being connected to at least one respective distribution channel;
  a supply channel;
  a selection device interposed between the supply channel and each of the distribution channels, the selection device comprising an internal body of spheroidal shape, in particular of spherical shape, the internal body being arranged in a housing of complementary shape formed in a body of the distribution device, the internal body being movable in rotation about two perpendicular axes, between a plurality of distribution positions, each distribution position of the internal body making it possible to put the supply channel and at least one of the distribution channels in fluid communication, the selection device further comprising a control element secured to the internal body and arranged outside the housing, the control element being operable by a user in order to modify the position of the internal body Thus, by providing a jet selection device comprising an internal body, which is at least partially spherical and movable about two axes of rotation between a plurality of distribution positions, the invention makes it possible to easily multiply the different possible positions, and therefore to multiply the types of jets possible, as well as the combinations between different types of jets The invention also makes it possible to move from one position to the other without any sequence or imposed order. The selection of the jet type is therefore simpler and more flexible for the user. Furthermore, the selection device according to the invention can be operated in a simple and intuitive manner. In particular, when it is integrated into a hand-held showerhead, it allows a user to use only one hand to hold the showerhead and operate the selection device.

In one embodiment, at least one distribution position of the internal body makes it possible to put the supply channel and, selectively, one of the distribution channels in fluid communication.

In one embodiment, at least two distribution positions of the internal body make it possible to put the supply channel and, selectively, one of the distribution channels in fluid communication, the passage from one position to the other making it possible to vary the supply flow rate of the distribution channel.

In one embodiment, at least one distribution position of the internal body makes it possible to simultaneously put at least two distribution channels in fluid communication with the supply channel.

In one embodiment, at least two distribution positions of the internal body make it possible to simultaneously put at least two distribution channels in fluid communication, the passage from one position to the other making it possible to vary the supply flow rate of each distribution channel.

In one embodiment, the internal body comprises an internal channel configured to put the supply channel in fluid communication with at least one distribution channel when the internal body is in a distribution position.

In one embodiment, the internal channel has at least one bifurcation at which it divides into at least two branches.

In one embodiment, the internal channel comprises a bent portion.

In one embodiment, the internal body comprises at least two internal channels, the internal channels being configured so that, when the internal body is in a dispensing position:
  they are simultaneously in fluid communication with the supply channel when the distribution device comprises a single supply channel, or
  they are each in fluid communication with a respective supply channel when the distribution device comprises more than one supply channel.

In one embodiment, the external surface of the internal body comprises at least one groove cooperating with the housing of the internal body to form an external channel, the external channel being configured to put the supply channel in fluid communication with at least one distribution channel when the internal body is in a distribution position.

In one embodiment, the selection device comprises an activation element, which is movable between several activation positions, in which it opens a passage between the supply channel and at least one of the distribution channels, the activation element activation being driven in movement by the internal body.

In one embodiment, the distribution device comprises a system for guiding the internal body, comprising a follower element cooperating with a guide device, the follower element being:
  either secured to the internal body, the guide device then being fixed relative to the body of the distribution device;

or fixed relative to the body of the distribution device, the guide device then being secured to the internal body.

In one embodiment, the follower element is a protruding element, such as a lug, the follower element being at least partially inserted in a groove of a network of grooves, the network of grooves making it possible to guide the movement of the follower element.

In one embodiment, the internal body is movable in rotation about a third axis, the three axes of rotation of the internal body being perpendicular two by two.

In one embodiment, the third axis coincides with an axis of symmetry of the control element.

In one embodiment, the rotation of the control element about the third axis makes it possible to control a variation in the supply flow rate of a distribution channel which is in fluid communication with the supply channel.

In one embodiment, the control element is movable relative to the internal body, modifying the position of the control element relative to the internal body, making it possible to activate or deactivate a function.

In one embodiment, the selection device is configured so that at least one position of the internal body corresponds to a stop position, position in which the selection device blocks the passage to the distribution channels of a flow entering the supply channel.

In one embodiment, the distribution device comprises one or more elastic return devices, such as springs, making it possible to limit the movements of the internal body.

In one embodiment, the distribution device comprises one or more stops making it possible to limit the amplitude of movements of the internal body.

In one embodiment, the distribution device is a hand-held showerhead type device, the body comprising a portion forming a gripping handle, and comprising a connection device making it possible to connect the distribution device to a supply pipe such as a flexible pipe.

In one embodiment, the distribution device is a showerhead type device, comprising a device for connecting to a supply pipe allowing the fixation of the distribution device to a partition, in particular a wall partition.

In one embodiment, the distribution device comprises a diffusing device for a product, in particular an encapsulated product, the diffusing device being configured to diffuse a product contained in an extractable capsule or in a container such as a reservoir secured to the distribution device into the flow(s) of water ejected by the distribution device, the diffusing device being arranged, for example, in the distribution head.

The present invention will be better understood on reading the detailed description which follows, made with reference to the appended drawings, in which:

FIG. 4b is a cross-sectional view of the distribution channels of FIG. 4a;

FIG. 10b represents a top sectional view showing an example of an interface element cooperating with the activation element of FIG. 10a;

Figure 1:
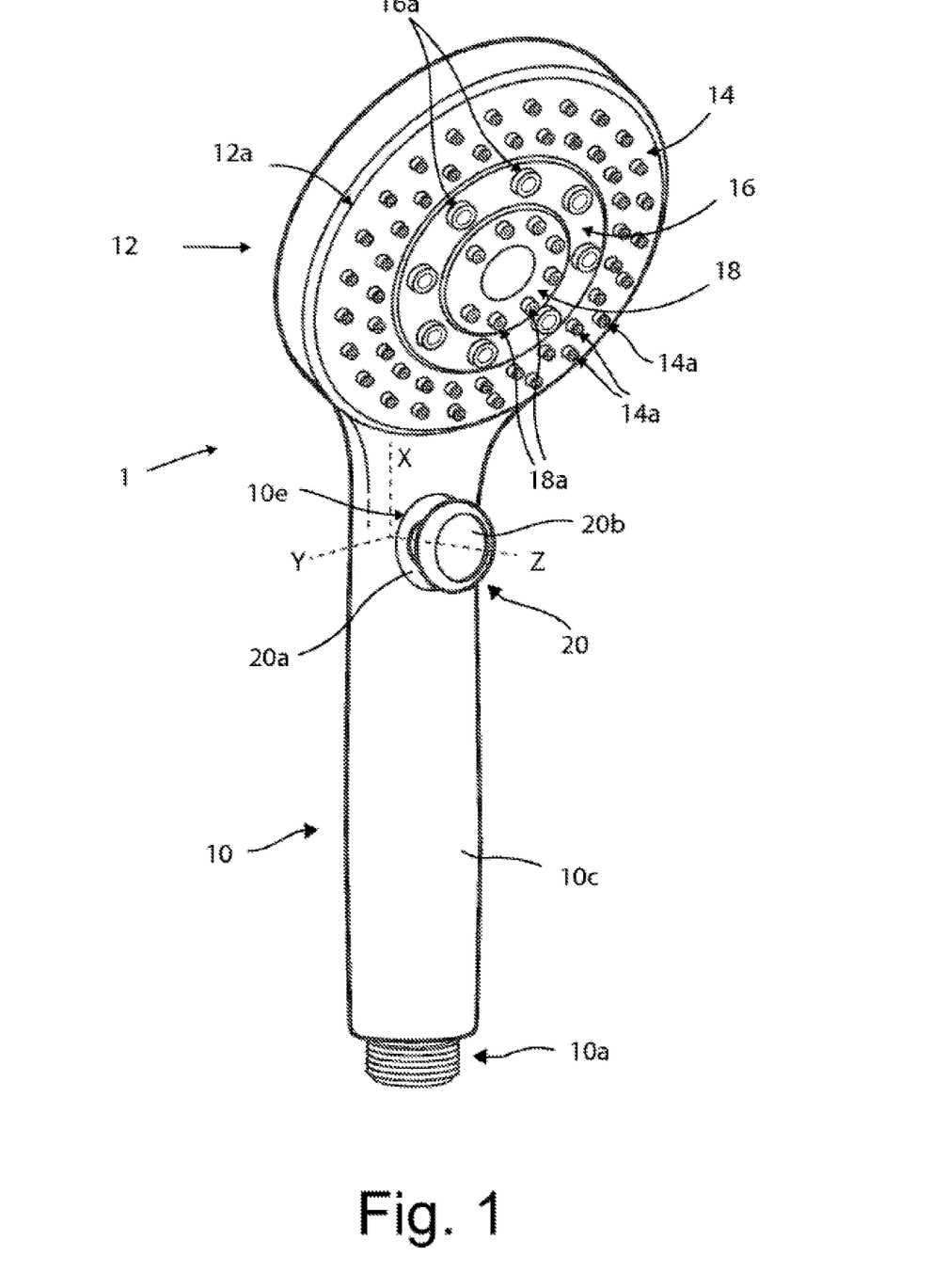
FIG. 1 is a perspective view of a distribution device according to the invention, in a hand-held showerhead type configuration.
Figure 2A:
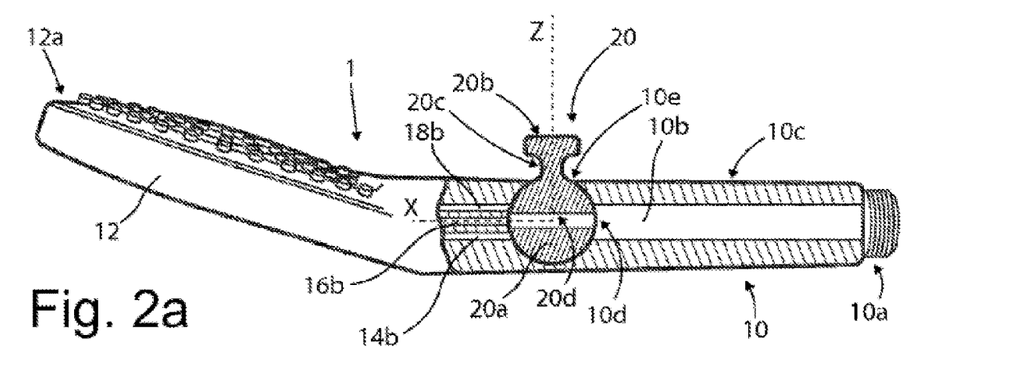
FIG. 2a is a side view of the device of FIG. 1 showing the integration of a selection device according to the invention.

FIGS. 1 and 2a are respectively perspective and side views of a water distribution device 1 according to the invention, in the example a hand-held showerhead, intended to be connected to a flexible water supply pipe. The showerhead 1 comprises a body 10 of elongated shape. The body 10 is secured, at a first end, to a distribution head 12 comprising at least two groups of nozzles for ejecting a flow of water. In the example, the distribution head 12 comprises three groups of nozzles 14, 16, 18, each comprising a plurality of nozzles 14a, 16a, 18a arranged on a distribution face 12a of the distribution head. The body 10 comprises, at a second end opposite the first end, a connection device 10a making it possible to connect the distribution device 1 to a water supply pipe, and in particular to a flexible supply pipe. The connection device 10a makes it possible to connect a water supply pipe to at least one internal supply channel 10b arranged within the body 10, and visible in particular in FIG. 2a. The internal supply channel(s) make it possible to bring a flow of water to the different groups of nozzles 14, 16, 18 of the distribution device 1. A portion 10c of the body 10 forms a gripping handle. The distribution device 1 is configured to be attached to a wall support via a flexible pipe to which the distribution device is connected. Alternatively, the distribution device 1 can comprise, near the first end, a fixing part, allowing it to be fixed directly to a wall support.

As visible in particular in FIG. 2a, which represents a partial section of the distribution device 1, each group of nozzles 14, 16, 18 is connected to at least one respective distribution channel 14b, 16b, 18b internal to the body 10 of the distribution device 1. In addition, a jet selection device 20 is interposed between the supply channel 10b and each of the distribution channels 14b, 16b, 18b. The selection device 20 comprises a movable internal body 20a, at least one portion of which is of spheroidal shape, and in particular of spherical shape, so as to be housed in an internal housing 10d of the body 10 of complementary shape. This configuration allows rotation of the internal body 20a relative to the body 10 of the distribution device 1 about at least two perpendicular axes X, Y. In the example of FIGS. 1 and 2, the axis X corresponds to a longitudinal axis of the distribution device, the axis Y corresponding to a transverse axis of the device.

The selection device 20 comprises a control element 20b, in the example a movable button 20b, secured to the internal body 20a. The button 20b extends outside the body 10 of the distribution device 1, the button 20b being connected to the internal body 20a by a rod 20c passing through an opening 10e formed in the body 10 and communicating with the housing 10d. The rod 20c extends from the internal body 20a along an axis Z perpendicular to the two axes X, Y of rotation of the internal body 20a. In the example, the button 20b has a general shape that is symmetrical about the axis Z.

The internal body 20a is movable between a plurality of positions, and in particular between a plurality of distribution positions. A distribution position is a position of the internal body 20a (and therefore of the selection device 20) in which the latter puts the supply channel 10b and at least one of the distribution channels 14b, 16b, 18b in fluid communication, so that a flow of water entering the distribution device 1 via the supply channel 10b is directed, via the internal body 20a of the selection device 20, towards at least one of the distribution channels, and therefore towards the corresponding nozzle group(s) Of course, the cooperation between the internal body 20a and its housing 10d ensures sufficient sealing, in order to prevent any leak and to ensure that the entire flow entering the supply channel 10b is distributed to the selected distribution channel(s). For this purpose, it may be possible to provide for sealing elements to be interposed between the housing 10d and the internal body 20a.

Advantageously, it can be provided that the internal body 20a, and therefore the selection device 20, is also capable of assuming at least one stop position, position in which a flow entering the supply channel 10b will be blocked and will therefore not be directed to any of the distribution channels. When the selection device 20 is in a stop position, the blocking of a flow entering the supply channel 10b can be carried out at the interface between the supply channel 10b and the selection device 20 and/or at the interface between the selection device 20 and the different distribution channels 14b, 16b, 18b.

In the example of FIG. 2a, the internal body 20a of the selection device comprises an internal through channel 20d. The internal channel 20d comprises:

at a first end, an inlet configured to be in fluid communication with the supply channel 10b when the internal body 20a is in a distribution position, and at a second end, an outlet configured to be in fluid communication with at least one of the distribution channels 14b, 16b, 18b when the internal body 20a is in a distribution position.

In the example, the internal channel 20d has a straight cylindrical shape and therefore has a constant cross section, but it can be of any other suitable shape. In particular, the internal channel 20d may have a non-cylindrical shape, for example a conical shape. The internal channel 20d may also have a non-straight shape, for example a bent shape.

Figure 2B:
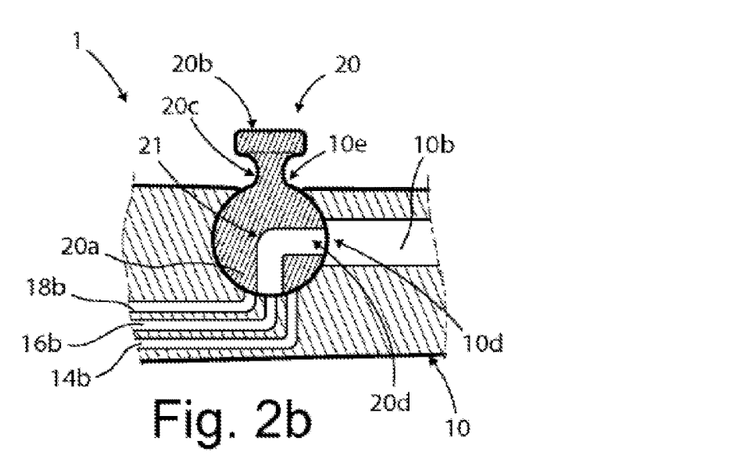
FIG. 2b is a partial view of a distribution device in which the selection device comprises an internal channel having a bent portion.
Figure 2C:
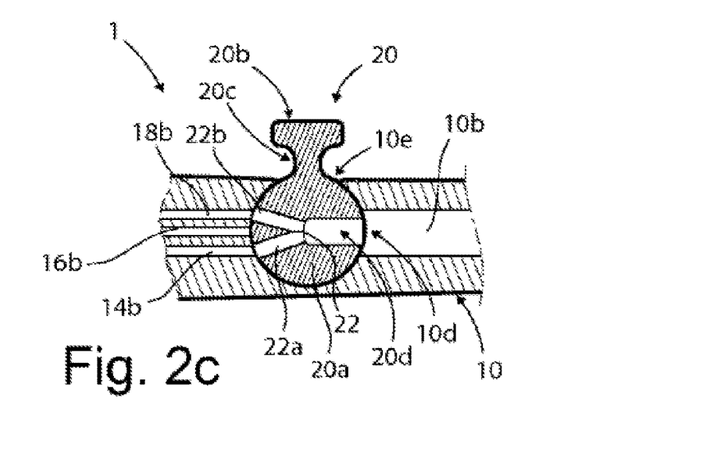
FIG. 2c is a partial view of the device of FIG. 2a, illustrating a selection device in which the internal channel of the internal body has a bifurcation.

FIG. 2b illustrates a selection device, in which the internal channel 20d comprises a bent portion 21. The bent portion 21 can form a bend whose angle is between 60° and 150°. In the example of FIG. 2c, the bent portion 21 forms a bend whose angle is equal to 90°. Providing that the internal channel 20d has a bend allows any movement of the control element 20b to result in a movement of the outlet orifice of the internal channel 20d (in particular when the control element 20b causes a rotational movement of the internal body 20a about the axis X). When the bent portion is configured so that the outlet orifice of the internal channel 20d is diametrically opposite to the control element 20b (for example in the case where the outlet orifice is centered on the Z axis of the FIG. 2a), then any movement of the control element 20b implies a movement of the same angular amplitude of the outlet orifice of the internal channel 20d.

As shown in FIG. 2c, the internal channel 20d may have at least one bifurcation 22, at which it divides into at least two branches 22a, 22b. Thus, the internal channel 20d can comprise a single inlet and two or more outlets. The presence of at least two outlets can, for example, make it possible to simultaneously put the internal channel 20d in fluid communication with at least two distribution channels. Such a configuration can also make it possible to put the internal channel 20d in fluid communication with a single distribution channel, via only one of the outlets, the other outlet(s) then being obstructed due to the position of the internal body 20a. The presence of at least one bifurcation 22 can facilitate the management of sealing between the internal channel 20d and the different distribution channels 14b, 16b, 18b, in particular when at least one distribution position is provided, making it possible to simultaneously supply at least two distribution channels 14b, 16b, 18b. Indeed, in such a case, the presence of at least one bifurcation makes it possible to provide one outlet per distribution channel that must be connected simultaneously. As visible in FIG. 2c, each outlet of the internal channel 20d can be put in fluid communication with a respective distribution channel 14b, 16b, 18b. Such a configuration simplifies the management of sealing as well as the integration of distribution channels (particularly from the point of view of space requirements). Furthermore, providing at least one bifurcation 22 can make it possible to increase the capacities of the selection device 20, in particular by increasing the number of possible distribution positions. Indeed, as visible in FIG. 2a, a rotation of the internal body 20a about the axis X implies a rotation of the internal channel 20d about its longitudinal axis when the latter coincides with the axis X. In the case of FIG. 2a, such a rotation does not imply any change from the point of view of the connection between the internal channel 20d and the distribution channels 14b, 16b, 18b. On the other hand, as visible in FIG. 2c, the presence of the bifurcation 22 implies that the outlets of the two branches 22a, 22b are offset with respect to the longitudinal axis of the internal channel 20d, and therefore with respect to the axis X. Thus, a rotation of the internal body 20a about the axis X implies a change in position of the outlets of the branches 22a, 22b. Such a rotation is therefore likely to modify the state of fluid communication between the internal channel 20d and the distribution channels 14b, 16b, 18b, and can therefore correspond to a change in distribution position.

Figure 3A:
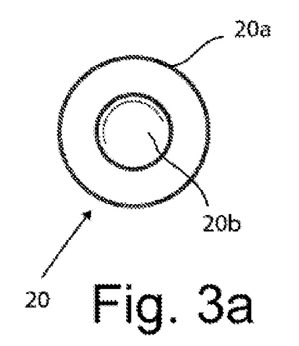
FIG. 3a shows the control element of the selection device in a neutral position.
Figure 3B:
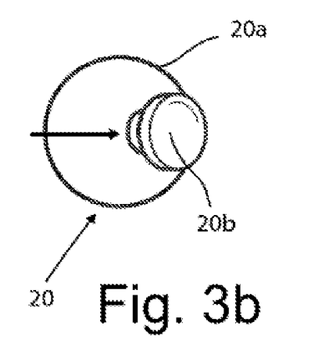
FIG. 3b shows the control element of the selection device in a first position.
Figure 3C:
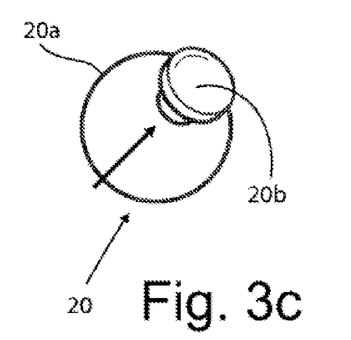
FIG. 3c shows the control element of the selection device in a second position.
Figure 3D:
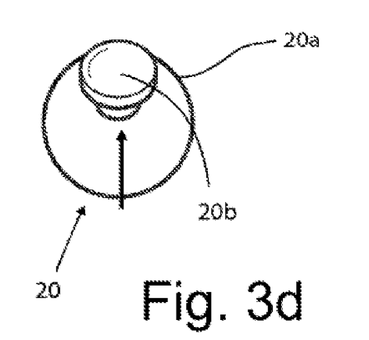
FIG. 3d shows the control element of the selection device in a third position.

As visible in particular in FIG. 2a, the selection device 20 allows a user to select, by simply moving the button 20b, which group(s) of nozzles 14, 16, 18 will be supplied with water. The design of the selection device 20 allows in particular a direct selection of a distribution position (and therefore of a type of jet), without necessarily passing through other positions beforehand, or at least not according to a predetermined and obligatory sequence. FIGS. 3a to 3d show the selection device 20 seen from above, in different positions of the button 20b and therefore of the internal body 20a. FIG. 3a represents the selection device 20 in a neutral position, which can correspond to a distribution position or to a stop position, depending on the configuration of the device. FIGS. 3b, 3c, 3d show the selection device in different positions of the button 20b. Each of these positions can correspond to a distribution position or to a stop position of the internal body 20a, depending on the configuration of the device.

Figure 4A:
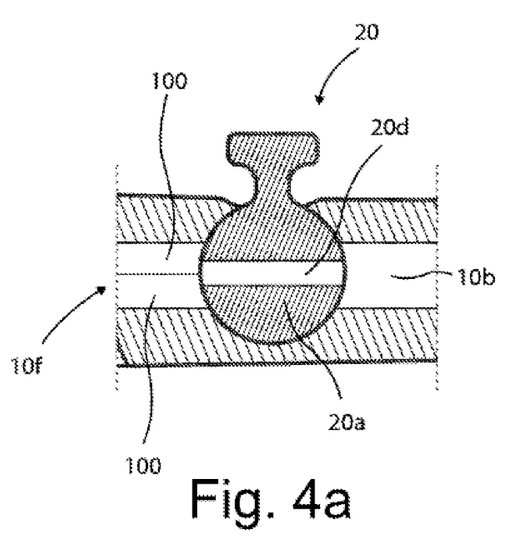
FIG. 4a is a side view of the selection device associated with distribution channels united within a distribution assembly.
Figure 4B:
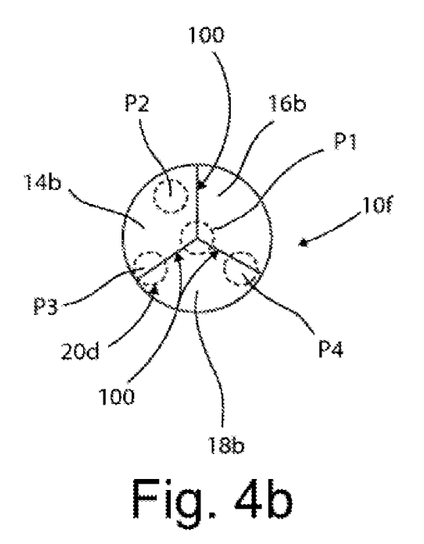

FIGS. 4a and 4b illustrate a configuration of the distribution device 1, in which the distribution channels 14b, 16b, 18b are adjacent and are united within a distribution assembly 10f, which in the example has a circular cross section. Thus, as visible in FIG. 4b, the distribution assembly 10f is formed by a channel of circular section comprising internal separation walls 100, these internal walls being oriented radially in the example. Each internal wall 100 constitutes a separation between two adjacent internal spaces, each internal space forming one of the distribution channels 14b, 16b, 18b.

4b shows in dotted lines different positions of the outlet of the internal channel 20d of the internal body 20a of the selection device 20. In a first position P1, the outlet of the internal channel 20d is aligned with the center of the distribution assembly 10f. In this position, the three distribution channels 14b, 16b, 18b are in fluid communication with the internal channel 20d, and each of these three distribution channels is supplied by a flow of water. In this position, the three groups of nozzles 14, 16, 18 are therefore supplied simultaneously. In a second position P2, the outlet of the internal channel 20d is opposite a single distribution channel 14b, and only the corresponding group of nozzles 14 will be supplied. In a third position P3, the outlet of the internal channel 20d is opposite two of the distribution channels 14b, 18b, and the corresponding internal wall 100 is aligned with a median plane of the internal channel 20d. In this position, the two distribution channels 14b, 18b are supplied simultaneously, with a substantially equal flow rate (the effective distribution of the flow rates being, however, also dependent on the configuration of the different distribution channels and the associated groups of nozzles). In a third position P4, the outlet of the internal channel 20d is opposite two of the distribution channels 16b, 18b, and the corresponding internal wall 100 is offset with respect to a median plane of the internal channel 20d. In this position, the two distribution channels 16b, 18b are supplied simultaneously, but with different respective flow rates.

The configuration of the selection device 20 shown in FIGS. 4a and 4b therefore allows, at the user's choice, to use a single group of nozzles, to simultaneously use at least two groups of nozzles, and, in this case, to vary the respective flow rates of each of the groups of nozzles supplied.

Figure 5:
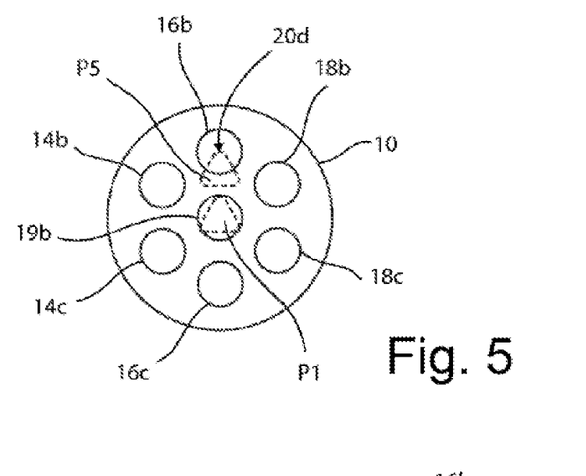
FIG. 5 is a cross-sectional view of distribution channels cooperating with a selection device comprising an internal channel making it possible to adjust the flow rate.

FIG. 5 shows a variant of the distribution device 1, in which the selection device 20 makes it possible to vary the flow rate entering a distribution channel. The distribution device of FIG. 5 comprises distribution channels 14b, 16b, 18b, 14c, 16c, 18c, 19b spaced apart from each other, in the example of circular cross section in the example.

The shape and the dimensions of the outlet of the internal channel 20d of the internal body 20a, shown in dotted lines in several distribution positions P1, P5, make it possible to select at least one of the distribution channels, and also make it possible to vary the flow entering into the selected distribution channel. In the example of FIG. 5, the internal channel 20d of the internal body 20a has a triangular cross section.

Figure 6A:
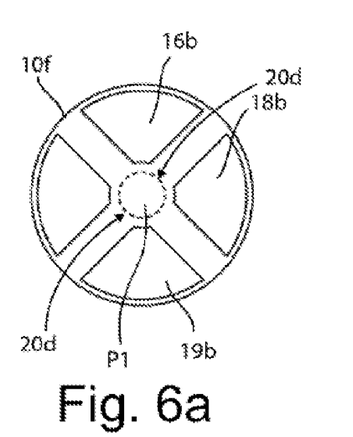
FIG. 6a is a cross-sectional view of distribution channels united within a distribution assembly, showing the position of the internal channel of the selection device when it is in a neutral position.
Figures 6B, 6C:
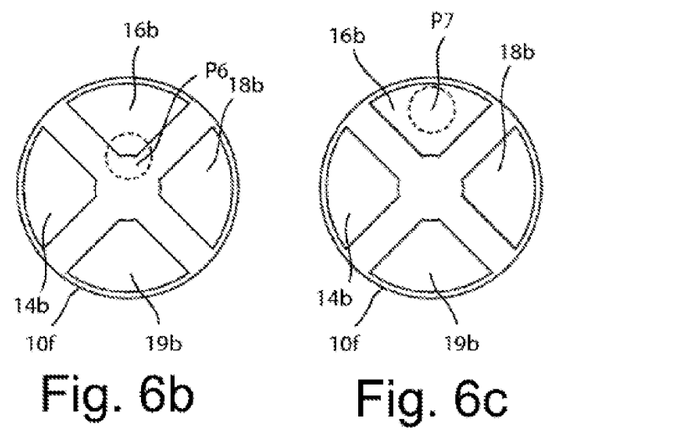
FIG. 6b represents the distribution assembly of FIG. 6a, the selection device being in a first distribution position.
FIG. 6c represents the distribution assembly of FIG. 6b, the selection device being in a second distribution position.

FIGS. 6a to 6c show a variant of the distribution device 1, in which the selection device makes it possible to vary, depending on the position of the selection device 20, the supply flow rate of a distribution channel, as well as to obtain a stop position. We show in FIGS. 6a to 6c a cross section of the distribution channels 14b, 16b, 18b, 19b, which are four in number in the example, and united within a distribution assembly 10f similar to that of the FIGS. 4a and 4b. The distribution channels 14b, 16b, 18b, 19b thus form sectors within this distribution assembly 10f and are further shaped so that a central location of the distribution assembly 10f, corresponding to a neutral position of the selection device 20, is not occupied by a distribution channel. Thus, as shown in FIG. 6a, in which the position of the internal channel 20d is shown in dotted lines, the neutral position of the selection device 20 (and therefore of the internal body 20a) corresponds to a stop position, position in which no flow entering the supply channel is transmitted by the selection device 20. The configuration of the selection device 20 of FIGS. 6a to 6c also makes it possible to vary the flow rate supplied to a distribution channel, as visible in FIGS. 6b and 6c, which show two distribution positions P6, P7 of the internal body 20a, position in which the internal channel 20d is in fluid communication with one of the distribution channels 14b, 16b, 18b, 19b. These different positions make it possible to obtain a more or less high flow rate, depending on the section of the internal channel 20d located opposite the corresponding distribution channel 16b.

Figure 7A:
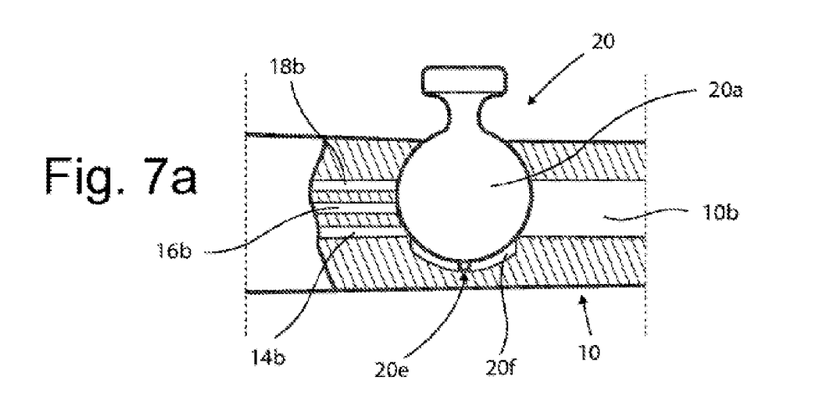
FIG. 7a represents the selection device when a system for guiding the movement of the internal body is provided.
Figure 7B:
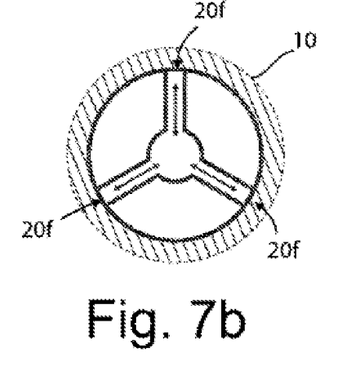
FIG. 7b represents a first example of a guide device comprising a network of grooves.
Figure 7C:
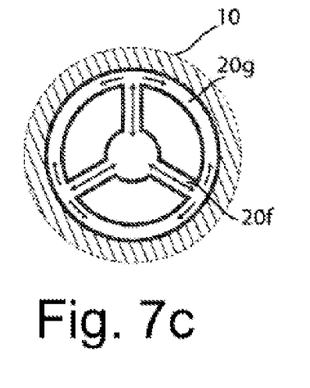
FIG. 7c represents a second example of a guide device comprising a network of grooves.
Figure 7D:
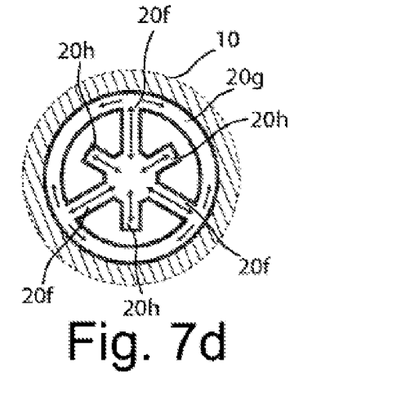
FIG. 7d represents a third example of a guide device comprising a network of grooves.

FIGS. 7a to 7d show a variant of the distribution device 1 in which a system for guiding the internal body 20a of the selection device 20 is provided. As visible in FIG. 7a, the guide system comprises a follower element 20e, in the example a lug secured to the internal body 20a, this follower element cooperating with a fixed guide device relative to the body 10 of the distribution device. In the example, the guide device comprises one or more grooves 20f, 20g, 20h making it possible to guide the follower element 20e, and thus to limit the movement of the internal body 20a to predefined paths. FIGS. 7b to 7d show examples of the guide device of the follower element 20e. FIGS. 7b to 7d are partial sectional views of the body 10 of the distribution device, showing the guide device seen from above. In FIG. 7b, the guide device comprises three main grooves 20f of radial orientation, distributed angularly, and communicating with each other at a central zone corresponding to the neutral position of the internal body 20a (and therefore of the selection device 20). In such a configuration, the selection device 20 can thus be maneuvered in three different directions, as shown by the arrows shown in FIG. 7b.

FIG. 7c shows a guide device similar to that of FIG. 7b, but additionally comprising a circular peripheral groove 20g, communicating with each of the main grooves 20f. As shown by the arrows in FIG. 7c, such a configuration makes it possible to maneuver the selection device in a circular movement, in addition to the three main directions. FIG. 7d shows a guide device similar to that of FIG. 7c, but comprising in addition three secondary grooves 20h of radial orientation, angularly distributed in different directions from the main grooves 20f. In the example, the secondary grooves 20h do not communicate with the peripheral groove 20g, and have a length less than that of the main grooves 20f. It is therefore understood that the movement of the internal body 20a in a direction corresponding to one of the secondary grooves 20h will have a more limited amplitude than in a direction corresponding to one of the main grooves 20f. As can be seen from the examples in FIGS. 7b to 7d, a guide system of the selection device 20 makes it possible to impose directions of movement and/or limit the amplitude of movement in certain directions of movement. Alternatively, the guide system described above could be configured so that the follower element 20e is fixed relative to the body 10 of the distribution device, while the guide device is secured to the internal body 20a of the selection device, the guide device comprising, for example, one or more grooves formed on the surface of the internal body 20a.

Figure 8:
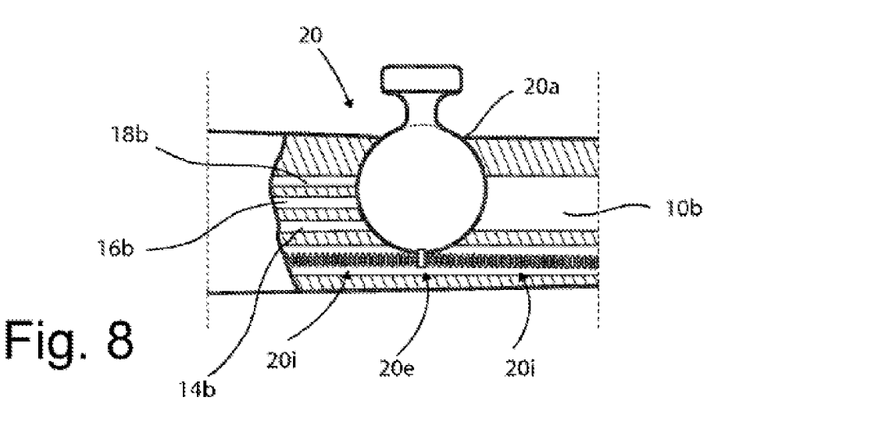
FIG. 8 represents a selection device comprising a system for constraining the movement of the internal body.

FIG. 8 shows a variant of the distribution device comprising a system for constraining the movement of the internal body 20a. Such a system comprises one or more elastic return devices, such as springs 20i, configured to bias the internal body 20a towards the neutral position of the selection device, and/or to limit the amplitude of movements of the internal body, and/or to introduce a force feedback which is perceptible by the user. In the example of FIG. 8, there is provided a set of springs 20i secured on the one hand to the internal body 20a via a lug 20e, the springs being on the other hand secured to the body 10 of the distribution device.

Figure 9A:
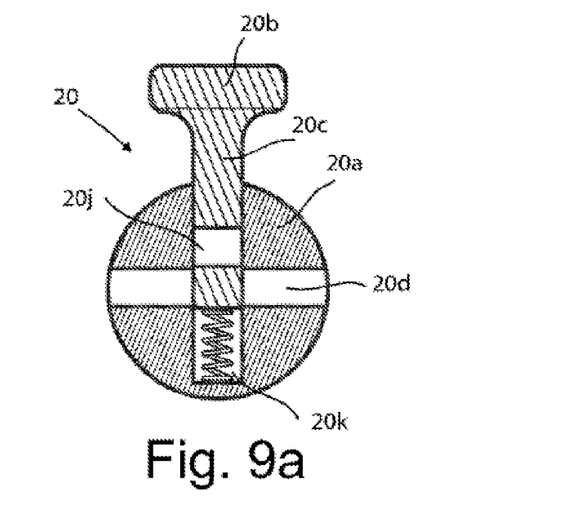
FIG. 9a represents a selection device in which the control element is movable relative to the internal body, the control element being in a first position.
Figure 9B:
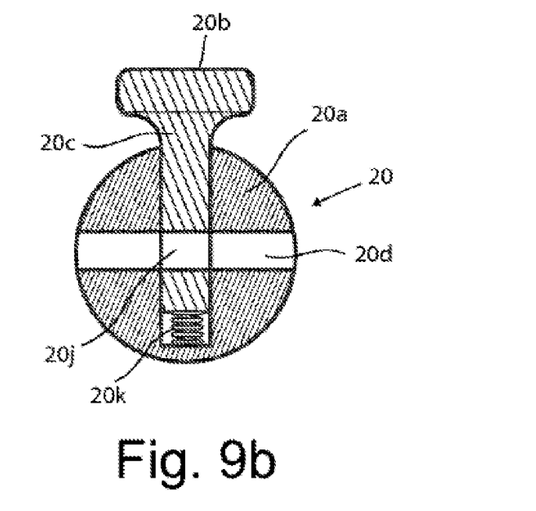
FIG. 9b represents the selection device of FIG. 9a, the control element being in a second position.

FIGS. 9a and 9b show a variant of the selection device 20, in which the button 20b is movably mounted on the internal body 20a. In the example of FIGS. 9a and 9b, the rod 20c carrying the button 20b is mounted movable in translation in the internal body 20a, along the axis Z. The possibility of movement of the button 20b relative to the internal body 20a allows to provide additional functions of the selection device. In the example, the movement of the button 20b makes it possible to open and close the internal channel 20d of the internal body 20a. For this purpose, the rod 20c is movable between a first position (visible in FIG. 9a), in which the rod 20c closes the internal channel 20d, and a second position (visible in FIG. 9b), in which the rod leaves the internal channel 20d open. The rod 20c has a through opening 20j which coincides with the internal channel 20d when the rod 20c is in the second position. Preferably, the selection device 20 comprises a system for indexing the position of the rod (not shown), associated with a spring 20k, allowing a user to pass from the first to the second position, and vice versa, by pressing the button 20b.

Figure 10A:
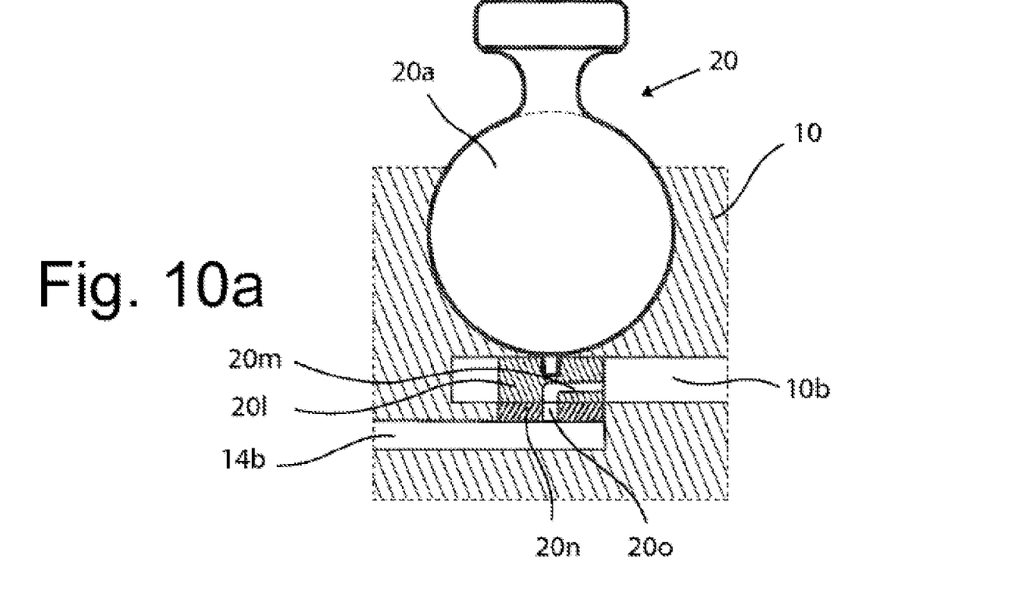
FIG. 10a represents a selection device in which the internal body is connected to at least one activation element, which is movable between a plurality of distribution positions, the activation element cooperating with an interface element.
Figure 10B:
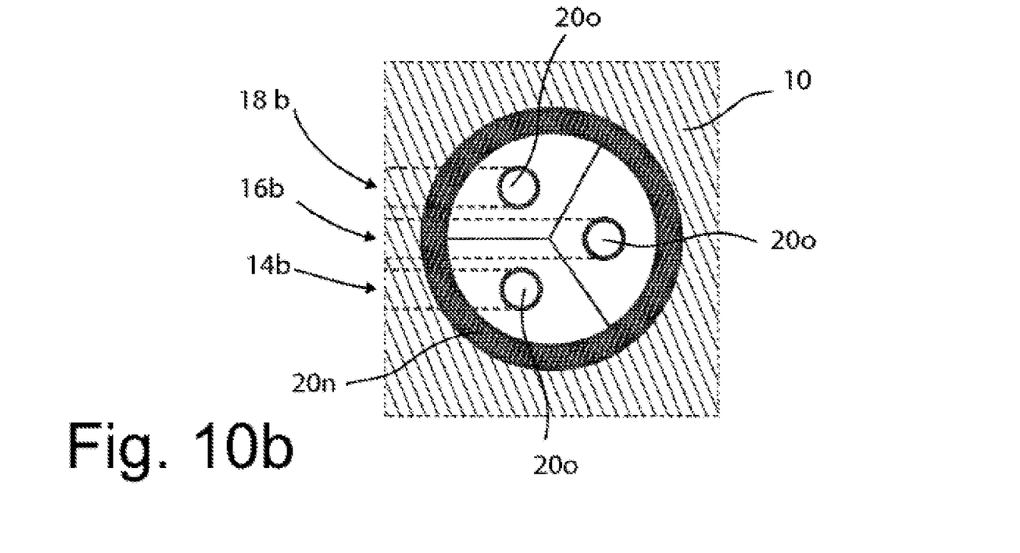

FIGS. 10a and 10b show a variant of the selection device 20, in which a flow of water entering the supply channel 10b of the distribution device 1 is not modified or redirected directly by the internal body 20a, but via one or more movable activation elements 201, the activation element(s) 201 being moved by the internal body 20a. In the example of FIGS. 10a and 10b, the activation element 201 comprises an internal channel 20m which is in fluid communication with the supply channel 10b and which can be connected, directly or indirectly, to one or the other of the distribution channels 14b, 16b, 18b. In the example of FIGS. 10a and 10b, the activation element 201 puts the supply channel 10b in fluid communication with one or more of the distribution channels 14b, 16b, 18b via a fixed interface element 20n, the latter comprising a plurality of internal channels 20o, each internal channel 20o being respectively connected to one of the distribution channels 14b, 16b, 18b. In the example of FIG. 10a, the interface element 20n comprises three juxtaposed channels 20o, the distribution channels 14b, 16b, 18b also being juxtaposed.

In the example of FIG. 10b, which is a partial sectional view of the body 10 showing the interface element 20n seen from above, the interface element 20n is of circular shape, and each internal channel 20o opens onto an internal space forming a sector of this element. Thus, the movement of the activation element 201 makes it possible to simultaneously put the supply channel 10b in fluid communication with one or more internal channels 20o of the interface element 20n, and therefore a distribution channel in a selective manner, or with several distribution channels. By preventing a flow of water entering the supply channel 10b from being redirected directly by the internal body 20a of the selection device 20, and redirecting it instead via one or more activation elements 201 external to the internal body 20a, the selection device 20 of FIGS. 10a-10b can make it possible to simplify the management of the sealing thereof.

Figure 11A:
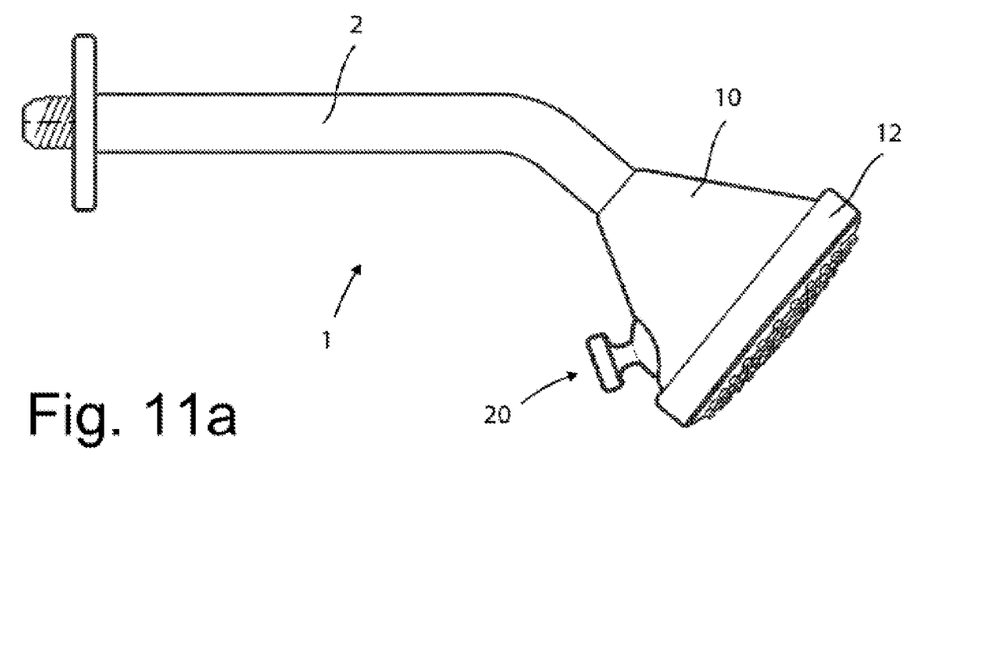
FIG. 11a is a view of a distribution device according to the invention in a showerhead type configuration

FIG. 11a represents a distribution device 1 of the showerhead type. In this configuration, the distribution device 1 can be fixed to a wall, and connected to a water supply pipe via a rigid tubular arm 2. In the example of FIG. 11a, the distribution device selection 20 is arranged near the distribution head 12, behind the distribution face 12a.

Figure 11B:
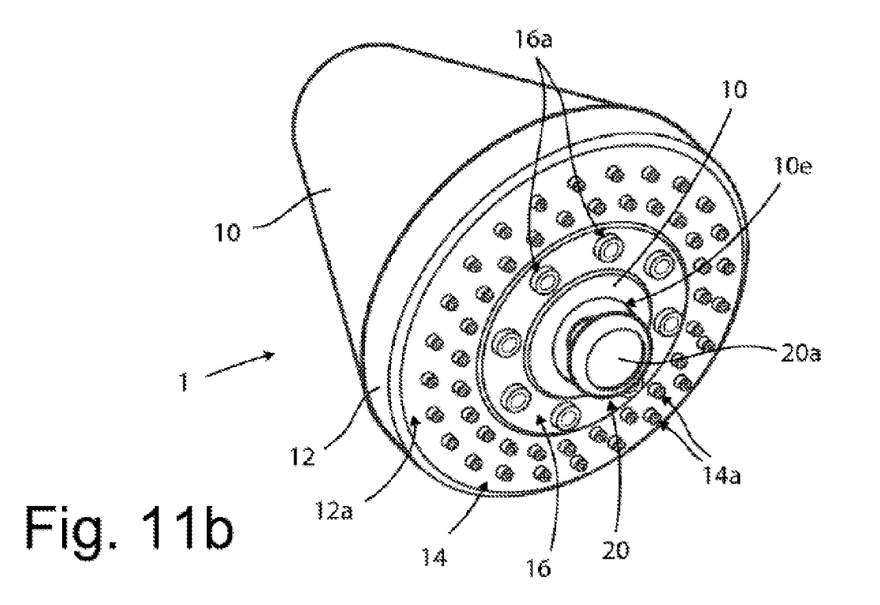
FIG. 11b is a perspective view of a showerhead type distribution device, in which the selection device is arranged at the distribution head.

FIG. 11b represents a distribution device 1 of the showerhead type, in which the selection device 20 is arranged at the distribution face 12a of the distribution head. For this purpose, the body 10 of the distribution device is configured such that the housing 10d containing the internal body 20a of the selection device 20 opens at the distribution face 12a. In the example, the opening 10e of the housing 10d is located in the center of the distribution face 12a.

In the example of the figures, the internal body 20a is movable in rotation about two perpendicular axes X, Y of rotation, that is to say the mechanical connection between the internal body 20a and the body 10 of the distribution device is a spherical finger type connection (or ball joint with finger). It can be provided that the internal body 20a is movable in rotation about three axes X, Y, Z of rotation perpendicular two by two, the mechanical connection between the internal body and the body of the distribution device then being of the ball joint type. In this case, the third axis Z of rotation is parallel to the axis of extension of the rod carrying the control element, and therefore parallel, in the example, to the axis of symmetry of the control element 20b. In such a configuration, it can be provided that the rotation of the control element 20b on itself allows a user to control a function. For example, it could be provided that when the selection device is in a distribution position, rotation of the control element causes the flow rate to vary.

Advantageously, whatever the configuration of the selection device 20, a flow limiting device can be provided on all or some of the distribution channels, making it possible to limit the flow in the corresponding channels, whatever the pressure of the entering flow of water. Furthermore, a regulation device could be provided at the supply channel, making it possible to limit the pressure experienced by the selection device.

Advantageously, the selection device can comprise one or more stops, making it possible to limit the amplitude of the movement of the internal body 20a.

Advantageously, the internal body 20a of the selection device can comprise at least two internal channels. When the distribution device comprises a single supply channel, then, in at least one position of the selection device, the two internal channels can be put simultaneously in fluid communication with the supply channel. When the distribution device comprises at least two separate supply channels, it can be provided that, in at least one position of the selection device, the internal channels are each put in fluid communication with a respective supply channel. In such a configuration, it could be envisaged that the supply channels serve to supply different fluids, for example water and air.

The distribution device advantageously comprises a diffusing device for a product, in particular an encapsulated product, the diffusing device being configured to diffuse a product contained in an extractable capsule or in any other suitable container (for example a reservoir secured to the distribution device and fillable by the user) into the flow(s) of water ejected by the distribution device, the diffusing device being arranged, for example, in the distribution head.

The invention claimed is:

1. A water distribution device, comprising:
    a distribution head, the distribution head including at least two groups of nozzles;
    at least two distribution channels, each group of nozzles in fluid communication with at least one distribution channel;
    a supply channel; and
    a jet selection device, the jet selection device interposed between the supply channel and each of the distribution channels, the jet selection device movable between a plurality of distribution positions, each distribution position putting the supply channel in fluid communication with at least one of the distribution channels, the jet selection device including an internal body, the internal body including an internal channel, the internal channel extending through the internal body and being configured to put the supply channel in fluid communication with at least one of the distribution channels when the internal body is in one of the distribution positions;
    wherein the jet selection device is movable between distribution positions in a non-predetermined order.

2. The water distribution device of claim 1, wherein:
    the jet selection device is movable between distribution positions to provide variation in a supply flow rate of at least one of the distribution channels.

3. The water distribution device of claim 1, wherein:
    at least one distribution position simultaneously puts the supply channel in fluid communication with at least two of the distribution channels.

4. The water distribution device of claim 1, further comprising:
    a body;
    wherein the jet selection device is rotatable relative to the body.

5. The water distribution device of claim 4, wherein:
    the jet selection device is rotatable relative to the body about at least two perpendicular axes.

6. The water distribution device of claim 5, wherein:
    the jet selection device is rotatable relative to the body about three perpendicular axes.

7. The water distribution device of claim 1, further comprising:
    a body;
    wherein the body includes an internal housing have a shape;
    wherein the jet selection device includes an internal body; and
    wherein the shape of the internal housing of the body is complementary to the shape of the internal body of the jet selection device.

8. The water distribution device of claim 1, wherein:
    the water distribution device is one of a handheld showerhead and a fixed showerhead.

9. A water distribution device, comprising:
    a distribution head, the distribution head including at least two groups of nozzles;
    at least two distribution channels, each group of nozzles in fluid communication with at least one distribution channel;
    a supply channel; and
    a jet selection device, the jet selection device interposed between the supply channel and each of the distribution channels, the jet selection device movable between a plurality of distribution positions, each distribution position putting the supply channel in fluid communication with at least one of the distribution channels, the jet selection device including an internal body, the internal body including an internal channel, the internal channel extending through the internal body and being configured to put the supply channel in fluid communication with at least one of the distribution channels when the internal body is in one of the distribution positions;
    wherein the jet selection device is movable between distribution positions about at least two axes of rotation.

10. The water distribution device of claim 9, wherein:
    the jet selection device is movable between distribution positions to provide variation in a supply flow rate of at least two of the distribution channels.

11. The water distribution device of claim 9, wherein:
    at least one distribution position simultaneously puts the supply channel in fluid communication with at least two of the distribution channels.

12. The water distribution device of claim 9, wherein:
    the jet selection device is movable between distribution positions in a non-predetermined order.

13. The water distribution device of claim 9, further comprising:
    a body;
    wherein the jet selection device is rotatable relative to the body about at least two perpendicular axes.

14. The water distribution device of claim 13, wherein:
    the jet selection device is rotatable relative to the body about three perpendicular axes.

15. The water distribution device of claim 9, further comprising:
    a body;
    wherein the body includes an internal housing have a shape;
    wherein the jet selection device includes an internal body; and
    wherein the shape of the internal housing of the body is complementary to the shape of the internal body of the jet selection device.

16. The water distribution device of claim 9, wherein:
    the water distribution device is one of a handheld showerhead and a fixed showerhead.

17. A water distribution device, comprising:

a distribution head, the distribution head including at least two groups of nozzles;

at least two distribution channels, each group of nozzles in fluid communication with at least one distribution channel;

a supply channel; and a jet selection device, the jet selection device interposed between the supply channel and each of the distribution channels, the jet selection device movable between a plurality of distribution positions, each distribution position putting the supply channel in fluid communication with at least one of the distribution channels, the jet selection device including an internal body, the internal body including an internal channel, the internal channel extending through the internal body and being configured to put the supply channel in fluid communication with at least one of the distribution channels when the internal body is in one of the distribution positions;

wherein the jet selection device is movable between distribution positions about at least two axes of rotation; and wherein the jet selection device is movable between distribution positions to provide variation in a supply flow rate of at least one of the distribution channels.

18. The water distribution device of claim 17, wherein:
at least one distribution position simultaneously puts the supply channel in fluid communication with at least two of the distribution channels.

19. The water distribution device of claim 17, wherein:
the jet selection device is movable between distribution positions in a non-predetermined order.

20. The water distribution device of claim 17, further comprising:
a body;
wherein the jet selection device is rotatable relative to the body about at least two perpendicular axes.

21. The water distribution device of claim 20, wherein:
the jet selection device is rotatable relative to the body about three perpendicular axes.

22. The water distribution device of claim 17, further comprising:
a body;
wherein the body includes an internal housing have a shape;
wherein the jet selection device includes an internal body; and
wherein the shape of the internal housing of the body is complementary to the shape of the internal body of the jet selection device.

23. The water distribution device of claim 17, wherein:
the water distribution device is one of a handheld showerhead and a fixed showerhead.

* * * * *